(12) United States Patent
Bane et al.

(10) Patent No.: US 10,004,082 B2
(45) Date of Patent: *Jun. 19, 2018

(54) SYSTEM AND METHOD FOR DYNAMIC CHANNEL ALLOCATION

(71) Applicant: E.F. Johnson Company, Irving, TX (US)

(72) Inventors: Ronald Lee Bane, Haslet, TX (US); Brian J. Austin, Saginaw, TX (US)

(73) Assignee: E.F. Johnson Company, Irving, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/641,747

(22) Filed: Jul. 5, 2017

(65) Prior Publication Data

US 2017/0311336 A1   Oct. 26, 2017

Related U.S. Application Data

(63) Continuation of application No. 14/935,270, filed on Nov. 6, 2015, now Pat. No. 9,763,260.

(Continued)

(51) Int. Cl.
*H04W 72/10* (2009.01)
*H04W 84/08* (2009.01)
(Continued)

(52) U.S. Cl.
CPC ............ *H04W 72/10* (2013.01); *H04W 72/06* (2013.01); *H04W 72/082* (2013.01); *H04W 84/047* (2013.01); *H04W 84/08* (2013.01)

(58) Field of Classification Search
CPC ... H04W 72/10; H04W 72/06; H04W 72/082; H04W 84/08; H04W 84/047
See application file for complete search history.

(56) References Cited

U.S. PATENT DOCUMENTS

| 4,870,408 A | 9/1989 | Zdunek et al. |
| 5,214,789 A * | 5/1993 | George ............... H04W 72/044 455/439 |

(Continued)

FOREIGN PATENT DOCUMENTS

| DE | 4434372 A1 | 3/1996 |
| DE | 10104926 A1 | 11/2001 |

(Continued)

OTHER PUBLICATIONS

Telecommunications Industry Association (TIA) with Electronic Industries Alliance (EIA), TIA/EIA Standard: Project 25—Trunking Control Channel Messages, Addendum 1, SNDCP Trunking Control Channel Messages (ANSI/TIA/EIA-102.AABC-1), Sep. 2001, Telecommunications Industry Association (TIA), Arlington, VA (11 pages).

(Continued)

Primary Examiner — Nathan Mitchell
(74) Attorney, Agent, or Firm — Foley & Lardner LLP

(57) ABSTRACT

An exemplary system and method for dynamic channel allocation in an LMR system includes using one or more preference indicators to dynamically determine a channel allocation priority to be used for channel allocation when channel allocation requests are received. The preference indicators may include a channel failure indicator (e.g. a channel health indicator based on repeater failures), a channel priority indicator, a radio frequency interference indicator, a high reflected power indicator, an excessive current drain indicator, a loss of backbone communications indicator, and a channel usage indicator. If more than one preference indicator is used, the channel priority ranking may be determined using any of a variety of weightings and prioritizations of the various preference indicators to dynamically generate the channel allocation priority. The dynamic channel allocation system may include one or more site control- (Continued)

lers, servers, and/or one or more processors configured to implement the method of dynamic channel allocation.

38 Claims, 4 Drawing Sheets

Related U.S. Application Data

(60) Provisional application No. 62/076,473, filed on Nov. 6, 2014.

(51) Int. Cl.
  *H04W 84/04* (2009.01)
  *H04W 72/08* (2009.01)
  *H04W 72/06* (2009.01)

(56) References Cited

U.S. PATENT DOCUMENTS

| | | |
|---|---|---|
| 5,293,638 A | 3/1994 | Sasuta et al. |
| 5,420,909 A | 5/1995 | Ng et al. |
| 5,594,940 A | 1/1997 | Peterson et al. |
| 5,850,444 A | 12/1998 | Rune |
| 5,901,341 A * | 5/1999 | Moon .................. H04B 1/60 455/452.1 |
| 6,028,846 A | 2/2000 | Cain |
| 6,119,010 A | 9/2000 | Labedz |
| 6,134,514 A | 10/2000 | Liu et al. |
| 6,134,515 A | 10/2000 | Skogby |
| 6,141,347 A | 10/2000 | Shaughnessy et al. |
| 6,199,032 B1 | 3/2001 | Anderson |
| 6,336,035 B1 | 1/2002 | Somoza et al. |
| 6,545,995 B1 * | 4/2003 | Kinnunen ........... H04W 76/002 370/340 |
| 6,571,082 B1 | 5/2003 | Rahman et al. |
| 6,618,696 B1 | 9/2003 | Dean et al. |
| 6,744,746 B1 * | 6/2004 | Bartelme ............. H04L 1/0041 370/329 |
| 6,754,224 B1 | 6/2004 | Murphy |
| 6,771,703 B1 | 8/2004 | Oguz et al. |
| 6,771,966 B1 | 8/2004 | Chow |
| 6,813,593 B1 | 11/2004 | Berger |
| 6,822,947 B2 | 11/2004 | Sawyer et al. |
| 6,898,188 B1 | 5/2005 | Hamami |
| 6,934,555 B2 | 8/2005 | Silva et al. |
| 6,940,838 B1 | 9/2005 | Stead |
| 6,941,457 B1 | 9/2005 | Gundavelli et al. |
| 6,985,735 B2 | 1/2006 | Gustafsson |
| 6,996,510 B1 | 2/2006 | Reilly et al. |
| 7,006,467 B2 | 2/2006 | Anton, Jr. et al. |
| 7,035,643 B2 | 4/2006 | Slawitschka et al. |
| 7,056,217 B1 | 6/2006 | Pelkey et al. |
| 7,075,893 B1 | 7/2006 | Mlinarsky et al. |
| 7,080,147 B2 | 7/2006 | Wang et al. |
| 7,113,791 B2 | 9/2006 | Lepschy et al. |
| 7,120,432 B2 | 10/2006 | Voyer |
| 7,133,679 B2 | 11/2006 | Zhu |
| 7,184,790 B2 | 2/2007 | Dorenbosch et al. |
| 7,218,620 B2 | 5/2007 | Lee |
| 7,221,660 B1 | 5/2007 | Simonson et al. |
| 7,231,330 B2 | 6/2007 | Hernandez-Mondragon et al. |
| 7,236,779 B2 | 6/2007 | Lahav et al. |
| 7,246,055 B1 | 7/2007 | Singh |
| 7,251,456 B2 | 7/2007 | Chiu |
| 7,263,471 B2 | 8/2007 | Barbaresi et al. |
| 7,277,395 B2 | 10/2007 | Rosen et al. |
| 7,308,268 B2 | 12/2007 | Barbosa da Torre et al. |
| 7,324,588 B2 | 1/2008 | Green et al. |
| 7,379,740 B2 | 5/2008 | Da Torre et al. |
| 7,386,435 B2 | 6/2008 | Sutinen et al. |
| 7,403,779 B2 | 7/2008 | De Cambray-Mathan |
| 7,433,692 B2 | 10/2008 | De Santis et al. |
| 7,486,636 B2 | 2/2009 | Francalanci et al. |
| 7,564,805 B1 | 7/2009 | Cortez et al. |
| 7,596,377 B2 | 9/2009 | Barberis et al. |
| 7,636,339 B2 | 12/2009 | Shaffer et al. |
| 7,639,988 B2 | 12/2009 | Abusch-Magder et al. |
| 7,664,846 B2 | 2/2010 | Tiruthani |
| 7,672,669 B2 | 3/2010 | Alexander et al. |
| 7,698,121 B2 | 4/2010 | Steenkiste et al. |
| 7,729,287 B2 | 6/2010 | Griffiths |
| 7,738,407 B2 | 6/2010 | Chow et al. |
| 7,747,248 B2 | 6/2010 | Escott |
| 7,747,249 B2 | 6/2010 | Guo et al. |
| 7,760,660 B2 | 7/2010 | Conway |
| 7,764,633 B2 | 7/2010 | Marque-Pucheu |
| 7,765,093 B2 | 7/2010 | Li et al. |
| 7,770,068 B2 | 8/2010 | Drees |
| 7,783,463 B2 | 8/2010 | Herro |
| 7,796,983 B2 | 9/2010 | Pao et al. |
| 7,809,659 B1 | 10/2010 | Paiz |
| D636,361 S | 4/2011 | Frandsen et al. |
| 7,929,475 B2 | 4/2011 | Simonson et al. |
| 7,970,425 B2 | 6/2011 | Balachandran et al. |
| 8,059,574 B2 | 11/2011 | Roy et al. |
| 8,160,076 B1 | 4/2012 | Aggarwal et al. |
| 8,255,684 B2 | 8/2012 | Benshetler et al. |
| 8,352,223 B1 | 1/2013 | Anthony et al. |
| 8,483,114 B2 | 7/2013 | Roy et al. |
| 8,694,774 B2 | 4/2014 | Benshetler et al. |
| 9,148,421 B2 | 9/2015 | Benshetler et al. |
| 9,252,982 B2 | 2/2016 | Jobe et al. |
| 9,516,475 B2 | 12/2016 | Roy et al. |
| 9,763,260 B2 | 9/2017 | Bane et al. |
| 9,774,386 B2 | 9/2017 | Roy et al. |
| 9,800,460 B2 | 10/2017 | Roy et al. |
| 2001/0010689 A1 | 8/2001 | Awater et al. |
| 2002/0114302 A1 | 8/2002 | McDonald et al. |
| 2002/0155839 A1 * | 10/2002 | Nisbet ..................... G01S 5/14 455/445 |
| 2003/0016834 A1 | 1/2003 | Blanco et al. |
| 2003/0058858 A1 | 3/2003 | Berlyoung et al. |
| 2003/0063569 A1 | 4/2003 | Kalliokulju et al. |
| 2003/0086405 A1 | 5/2003 | Silva et al. |
| 2003/0095510 A1 | 5/2003 | Dorenbsoch |
| 2004/0070515 A1 | 4/2004 | Burkley et al. |
| 2004/0132453 A1 | 7/2004 | Gabriel et al. |
| 2004/0170149 A1 | 9/2004 | Lee |
| 2004/0214577 A1 | 10/2004 | Borst et al. |
| 2004/0214583 A1 | 10/2004 | Graham et al. |
| 2005/0165919 A1 | 7/2005 | Qian et al. |
| 2005/0174986 A1 | 8/2005 | Emond et al. |
| 2005/0180448 A1 | 8/2005 | Kobayashi |
| 2005/0198359 A1 | 9/2005 | Basani et al. |
| 2005/0233751 A1 | 10/2005 | Bardwell |
| 2005/0267928 A1 | 12/2005 | Anderson et al. |
| 2005/0281208 A1 | 12/2005 | Dorenbosch et al. |
| 2005/0282590 A1 | 12/2005 | Haparnas |
| 2006/0140125 A1 | 6/2006 | Ottinger et al. |
| 2006/0160562 A1 | 7/2006 | Davis et al. |
| 2006/0205398 A1 | 9/2006 | Seckendorf et al. |
| 2006/0211443 A1 | 9/2006 | Wegman |
| 2006/0217120 A1 | 9/2006 | Annunziato et al. |
| 2006/0217122 A1 | 9/2006 | Levit et al. |
| 2006/0240814 A1 | 10/2006 | Cutler |
| 2006/0262800 A1 | 11/2006 | Martinez et al. |
| 2006/0274659 A1 | 12/2006 | Ouderkirk |
| 2006/0282247 A1 | 12/2006 | Brennan et al. |
| 2007/0014263 A1 | 1/2007 | Ferrato et al. |
| 2007/0019769 A1 | 1/2007 | Green et al. |
| 2007/0061442 A1 | 3/2007 | Kan et al. |
| 2007/0072619 A1 | 3/2007 | Wei et al. |
| 2007/0104121 A1 | 5/2007 | Shaffer et al. |
| 2007/0147296 A1 | 6/2007 | Barbaresi et al. |
| 2007/0147357 A1 | 6/2007 | Pelletier et al. |
| 2007/0160181 A1 | 7/2007 | Barbaresi et al. |
| 2007/0242670 A1 | 10/2007 | Simonson et al. |
| 2007/0259692 A1 | 11/2007 | Venkatachalam |
| 2007/0263597 A1 | 11/2007 | Morinaga et al. |
| 2007/0263798 A1 | 11/2007 | Dewing et al. |
| 2007/0293159 A1 | 12/2007 | Etelapera |
| 2008/0056466 A1 | 3/2008 | Nishimura |
| 2008/0076425 A1 | 3/2008 | Khetawat et al. |

(56) References Cited

U.S. PATENT DOCUMENTS

| | | |
|---|---|---|
| 2008/0114239 A1 | 5/2008 | Randall et al. |
| 2008/0123650 A1 | 5/2008 | Bhaskar |
| 2008/0144644 A1 | 6/2008 | Allan et al. |
| 2008/0161006 A1 | 7/2008 | Ferrato et al. |
| 2008/0270098 A1 | 10/2008 | Sarkkinen |
| 2008/0293402 A1 | 11/2008 | Rajan et al. |
| 2009/0024845 A1 | 1/2009 | Benshetler et al. |
| 2009/0028059 A1 | 1/2009 | Barbaresi et al. |
| 2009/0052339 A1 | 2/2009 | Spring et al. |
| 2009/0112569 A1 | 4/2009 | Angus et al. |
| 2009/0140949 A1 | 6/2009 | Stratis et al. |
| 2009/0175209 A1* | 7/2009 | Roy ............... H04W 92/02 370/312 |
| 2009/0185502 A1 | 7/2009 | Sung et al. |
| 2009/0254330 A1 | 10/2009 | Goria |
| 2009/0305709 A1 | 12/2009 | Panico et al. |
| 2010/0020735 A1 | 1/2010 | Roy et al. |
| 2010/0035619 A1 | 2/2010 | Panico et al. |
| 2010/0105399 A1 | 4/2010 | Akerlund |
| 2010/0141565 A1 | 6/2010 | Frandsen et al. |
| 2010/0162036 A1 | 6/2010 | Linden et al. |
| 2010/0169446 A1 | 7/2010 | Linden et al. |
| 2010/0178925 A1 | 7/2010 | Bernini et al. |
| 2010/0227583 A1 | 9/2010 | Roy et al. |
| 2010/0232299 A1 | 9/2010 | Conway |
| 2010/0303033 A1* | 12/2010 | Shahar ............ H04W 72/1257 370/329 |
| 2011/0034170 A1 | 2/2011 | Zhong et al. |
| 2012/0002588 A1* | 1/2012 | Roy ............... H04W 24/08 370/315 |
| 2012/0035904 A1 | 2/2012 | Seckendorf et al. |
| 2012/0039201 A1 | 2/2012 | Roy et al. |
| 2012/0083307 A1 | 4/2012 | Roy et al. |
| 2012/0102097 A1 | 4/2012 | Jobe et al. |
| 2012/0331289 A1 | 12/2012 | Benshetler et al. |
| 2013/0072165 A1 | 3/2013 | Rondeau et al. |
| 2013/0114493 A1 | 5/2013 | Olivier et al. |
| 2013/0165134 A1* | 6/2013 | Touag ............ H04W 72/0486 455/452.1 |
| 2013/0215819 A1 | 8/2013 | Ji et al. |
| 2013/0294323 A1 | 11/2013 | Roy et al. |
| 2013/0337822 A1 | 12/2013 | Rubin et al. |
| 2014/0195801 A1 | 7/2014 | Benshetler et al. |
| 2014/0273916 A1* | 9/2014 | Roy ............... H04B 7/15507 455/404.1 |
| 2014/0357234 A1* | 12/2014 | Sullivan ............ H04W 4/06 455/412.1 |
| 2015/0057040 A1* | 2/2015 | Kuehner ............ H04W 4/08 455/509 |
| 2015/0326471 A1 | 11/2015 | Anandan et al. |
| 2016/0014818 A1 | 1/2016 | Reitsma et al. |
| 2016/0036624 A1* | 2/2016 | Roy ............... H04L 41/0668 370/221 |
| 2016/0100294 A1* | 4/2016 | Ruelke ............. H04L 5/0016 455/509 |
| 2016/0112882 A1 | 4/2016 | Jobe et al. |
| 2016/0135207 A1 | 5/2016 | Bane et al. |
| 2018/0054350 A1 | 2/2018 | Roy et al. |

FOREIGN PATENT DOCUMENTS

| | | |
|---|---|---|
| DE | 10061550 A1 | 6/2002 |
| DE | 102007008196 A1 | 8/2008 |
| EP | 1317158 A1 | 6/2003 |
| EP | 1335617 A1 | 8/2003 |
| EP | 1534032 A1 | 5/2005 |
| EP | 1534033 A1 | 5/2005 |
| EP | 2136582 A1 | 12/2009 |
| GB | 2427796 | 1/2007 |
| WO | WO-99/052314 A1 | 10/1999 |
| WO | WO-2005/006798 A1 | 1/2005 |
| WO | WO-2007/060808 A1 | 5/2007 |
| WO | WO-2007/078467 A2 | 7/2007 |
| WO | WO-2007/136270 A1 | 11/2007 |
| WO | WO-2008/014818 A1 | 2/2008 |
| WO | WO-2008/064706 A1 | 6/2008 |
| WO | WO-2008/151464 A1 | 12/2008 |
| WO | WO-2009/069507 A1 | 6/2009 |

OTHER PUBLICATIONS

Telecommunications Industry Association (TIA) with Electronic Industries Alliance (EIA), TIA/EIA Standard: Project 25—Trunking Control Channel Messages New Technology Standards Project Digital Radio Technical Standards (ANSI/TIA/EIA-102.AABC), May 2000, Telecommunications Industry Association (TIA), Arlington, VA (150 pages).

Telecommunications Industry Association (TIA) with Electronic Industries Alliance (EIA), TIA Standard: Project 25—Trunking Control Channel Messages, Addendum 2—Multiband Operations, New Technology Standards Project Digital Radio Technical Standards (ANSI/TIA-102.AABC-2), Dec. 2002, Telecommunications Industry Association (TIA), Arlington, VA (39 pages).

Telecommunications Industry Association (TIA) with Electronic Industries Alliance (EIA), TIA/EIA Telecommunications Systems Bulletin, APCO Project 25—Trunking Overview (TSB102.AABA), Apr. 1995, Telecommunications Industry Association (TIA), Arlington, VA (12 pages).

U.S. Appl. No. 60/950,868, filed Jul. 19, 2007; first-named inventor: Benshetler.

U.S. Appl. No. 60/950,870, filed Jul. 19, 2007; first-named inventor: Benshetler.

U.S. Appl. No. 60/963,131, filed Aug. 2, 2007; first-named inventor: Benshetler.

U.S. Appl. No. 61/790,588, filed Mar. 15, 2013; first-named inventor: Arindam Roy.

U.S. Appl. No. 62/076,473, filed Nov. 6, 2014; first-named inventor: Bane.

Office Action dated Oct. 15, 2010 issued in U.S. Appl. No. 11/937,963 (15 pages).

1st Notice of Allowance dated Mar. 4, 2011 issued in U.S. Appl. No. 11/937,963 (5 pages).

2nd Notice of Allowance dated Jul. 1, 2011 issued in U.S. Appl. No. 11/937,963 (7 pages).

Office Action dated Dec. 17, 2010 issued in U.S. Appl. No. 11/940,936 (12 pages).

Final Office Action dated Jul. 1, 2011 issued in U.S. Appl. No. 11/940,936 (16 pages).

Office Action dated Sep. 19, 2012 in U.S. Appl. No. 13/251,895.

Response to Non-Final Office Action, dated Dec. 19, 2012, in U.S. Appl. No. 13/251,895.

Notice of Allowance dated Mar. 12, 2013 in U.S. Appl. No. 13/251,895.

Office Action dated May 20, 2013 in U.S. Appl. No. 13/595,981.

Response to Office Action, dated Oct. 21, 2013, in U.S. Appl. No. 13/595,981.

Terminal Disclaimer dated Oct. 21, 2013, in U.S. Appl. No. 13/595,981.

Notice of Allowance dated Nov. 19, 2013 in U.S. Appl. No. 13/595,981.

Office Action dated Mar. 27, 2015, in U.S. Appl. No. 13/937,005.

Response to Office Action, dated Aug. 27, 2015, in U.S. Appl. No. 13/937,005.

Final Office Action dated Sep. 16, 2015, in U.S. Appl. No. 13/937,005.

Response to Final Office Action, dated Nov. 16, 2015, in U.S. Appl. No. 13/937,005.

Terminal Disclaimer dated Dec. 2, 2015, in U.S. Appl. No. 13/937,005.

Notice of Allowance dated Jan. 13, 2016 in U.S. Appl. No. 13/937,005.

Notice of Allowance dated Apr. 19, 2016 in U.S. Appl. No. 13/937,005.

Notice of Allowance dated Jul. 29, 2016 in U.S. Appl. No. 13/937,005.

(56) References Cited

OTHER PUBLICATIONS

Copending U.S. Appl. No. 14/200,812, filed Mar. 7, 2014, first-named inventor: Jeffery E. Benshetler.
Office Action dated Dec. 10, 2014 in U.S. Appl. No. 14/200,812.
Response to Office Action, dated Apr. 8, 2015, in U.S. Appl. No. 14/200,812.
Terminal Disclaimer dated Apr. 8, 2015, in U.S. Appl. No. 14/200,812.
Notice of Allowance dated May 26, 2015 in U.S. Appl. No. 14/200,812.
Copending U.S. Appl. No. 14/217,150, filed Mar. 17, 2014; first-named inventor: Arindam Roy.
Office Action dated Oct. 2, 2015, in U.S. Appl. No. 14/217,150.
Response to Office Action, dated Mar. 31, 2016, in U.S. Appl. No. 14/217,150.
Office Action dated Jul. 11, 2016, in U.S. Appl. No. 14/217,150.
Response to Office Action, dated Oct. 11, 2016, in U.S. Appl. No. 14/217,150.
Response to Advisory Action, dated Oct. 31, 2016, in U.S. Appl. No. 14/217,150.
Notice of Allowance dated Dec. 14, 2016, in U.S. Appl. No. 14/217,150.
Notice of Allowance dated Jul. 11, 2017, in U.S. Appl. No. 14/217,150.
Preliminary Amendment dated May 10, 2016, in U.S. Appl. No. 14/935,270.
Notice of Allowance dated Apr. 4, 2017, in U.S. Appl. No. 14/935,270.
Copending U.S. Appl. No. 15/494,391, filed Apr. 21, 2017; first-named inventor: Arindam Roy.
Office Action dated Jun. 5, 2017 in U.S. Appl. No. 15/494,391.
U.S. Appl. No. 15/494,391, Final Office Action dated Dec. 22, 2017, 23 pgs.
U.S. Appl. No. 14/979,007, Office Action dated Jan. 5, 2018, 23 pgs.
Alcober, J. et al., "Multi-site Model and Simulation of Trunking Systems," 5th IEEE International Conference on Universal Personal Communications, 1996, pp. 236-239, Universitat Politecnica de Catalunya, Barcelona.
Baker, D. et al., "The Design and Simulation of a Mobile Radio Network with Distributed Control," IEEE Journal on Selected Areas in Communications, Jan. 1984, pp. 226-237, vol. 2, Issue 1.
Chiani, M. et al., "A Semi-Analytical Approach for Performance Evaluation of TCP-IP Based Mobile Radio Links," Proceedings of Global Telecommunications Conference, 2000, pp. 937-942, vol. 2, IEEE, Piscataway, NJ.
Chrapkowski, A. et al., "Mobile Trunked Radio System Design and Simulation," 41st IEEE Vehicular Technology Conference, 1991, pp. 245-250, IEEE, New York, NY.
D'Aria, G. et al., "Simulation and Performance of the Pan-European Land Mobile Radio System," IEEE Transactions on Vehicular Technology, May 1992, pp. 177-189, vol. 41, Issue 2, IEEE.
Farrell, T.C., et al., "A Computer Simulation Analysis of Conventional and Trunked Land Mobile Radio for a System with a Small Number of User Groups," Military Communications Conference, Oct. 15-18, 1989, pp. 923-927, vol. 3.
Gladstone, K.J. et al., "Computer Simulation of Multipath Fading in the Land Mobile Radio Environment," Electronic Circuits and Systems, IEE Proceedings, Pt. G., Dec. 1980, pp. 323-330, vol. 127, Issue 6.
Harada, H. et al., "Simulation and Software Radio for Mobile Communications," book, 2002, pp. 335-364.
Liebl, G. et al., "A Real-Time Simulation Environment for IP-Traffic Over Cellular Links," 6th World Multiconference on Systemics, Cybernetics and Informatics Proceedings, 2002, pp. 1-6, vol. 4.
Liu, W. et al., "Parallel Simulation Environment for Mobile Wireless Networks," Proceedings of the 1996 Winter Simulation Conference, 1996, pp. 605-612, Coronado, CA.

Loo, C., "A Statistical Model for a Land Mobile Satellite Link," IEEE Transactions on Vehicular Technology, Aug. 1985, pp. 122-127, vol. 34, Issue 3, IEEE Vehicular Technology Society.
Nehme, G. et al., "A Simulation Study of High-Capacity Cellular Land-Mobile Radio-Communication Systems," Can. Elec. Eng. Journal, Jan. 1982, pp. 36-39, vol. 7, Issue 1, EIC, Canada.
Onoe, Y. et al., "Cooperation of Multiple Simulators for Mobile IP Networks," 17th International Conference on Advanced Information Networking and Applications, AINA 2003, pp. 367-372, IEEE, Piscataway, NJ.
Patzold, M. et al., "A Deterministic Digital Simulation Model for Suzuki Processes with Application to a Shadowed Rayleigh Land Mobile Radio Channel," IEEE Transactions on Vehicular Technology, May 1996, pp. 318-331, vol. 45, No. 2, IEEE.
Perennou, T. et al., "Two-Stage Wireless Network Emulation," Broadband Satellite Communication Systems and the Challenges of Mobility, 2005, pp. 181-190, vol. 169, IFIP International Federation for Information Processing.
Prasad, M.V. et al., "A Comparison of Land Mobile Radio Prediction Methods in Indian Rural Zones," IEEE International Conference on Personal Wireless Communications, 2005, pp. 217-219, IEEE.
Short, J. et al., "Mobile Wireless Network System Simulation," Wireless Networks, 1995, pp. 451-467, vol. 1, Issue 4, J.C. Baltzer AG, Science Publishers.
Simon, G. et al., "Simulation-based Optimization of Communication Protocols for Large-Scale Wireless Sensor Networks," 2003 IEEE Aerospace Conference Proceedings, 2003, pp. 1-8, IEEE.
Smith, J. I., "A Computer Generated Multipath Fading Simulation for Mobile Radio," IEEE Transactions on Vehicular Technology, Aug. 1975, pp. 39-40, vol. 24, Issue 3, IEEE.
Song, James, WARNSimulator, WayBack Machine, dated Jul. 1, 2007, 1 pg.
Zeng, X. et al., "GloMoSim: A Library for Parallel Simulation of Large-scale Wireless Networks," Parallel and Distributed Simulation, 1998, pp. 154-161, Dept of Computer Science, Los Angeles, CA.
Zhi-Yong, S. et al., "Design and Simulation of Trunking Communication System in TD-SCDMA Network Based on SIP Protocol," 2009 International Symposium on Information Engineering and Electronic Commerce, May 2009, pp. 481-485, IEEE.
Notice of Allowance dated Sep. 22, 2015 of U.S. Appl. No. 13/278,641.
Response to Advisory Action dated Feb. 9, 2015 in U.S. Appl. No. 13/278,641.
Advisory Action and Applicant-Initiated Interview Summary, dated Jan. 29, 2015 in U.S. Appl. No. 13/278,641.
Response to Final Office Action, dated Jan. 5, 2015 in U.S. Appl. No. 13/278,641.
Final Office Action, dated Oct. 8, 2014, in U.S. Appl. No. 13/278,641.
Response to Office Action, dated Sep. 18, 2014, in U.S. Appl. No. 13/278,641.
Office Action, dated Apr. 22, 2014, in U.S. Appl. No. 13/278,641.
Office Action dated Feb. 21, 2017 in U.S. Appl. No. 14/815,095.
Notice of Allowance dated Jun. 21, 2017 in U.S. Appl. No. 14/815,095.
Copending U.S. Appl. No. 14/979,007, filed Dec. 22, 2015, first-named inventor: Marshall Jobe.
Office Action dated Apr. 22, 2016 of U.S. Appl. No. 14/979,007.
Response to Office Action dated Apr. 22, 2016 of U.S. Appl. No. 14/979,007, filed Sep. 22, 2016.
Final Office Action dated Nov. 15, 2016 of U.S. Appl. No. 14/979,007.
Response to Final Office Action dated Nov. 15, 2016 of U.S. Appl. No. 14/979,007, filed Jan. 17, 2017.
Advisory Action and Interview Summary dated Feb. 7, 2017 of U.S. Appl. No. 14/979,007.
Response to Final Office Action dated Nov. 15, 2016 of U.S. Appl. No. 14/979,007, filed Feb. 15, 2017.
Office Action dated Jun. 28, 2017 of U.S. Appl. No. 14/979,007.
Response to Office Action dated Jun. 28, 2017 of U.S. Appl. No. 14/979,007, filed Sep. 28, 2017.

(56) References Cited

OTHER PUBLICATIONS

Copending U.S. Appl. No. 15/786,476, filed Oct. 17, 2017, first-named inventor: Roy.
Response to Office Action dated Jun. 5, 2017 in U.S. Appl. No. 15/494,391, filed Sep. 5, 2017.
U.S. Appl. No. 15/786,476, Office Action dated Feb. 26, 2018.

* cited by examiner

SYSTEM AND METHOD FOR DYNAMIC CHANNEL ALLOCATION

RELATED APPLICATION

Pursuant to 35 U.S.C. § 120, this application is a continuation of U.S. patent application Ser. No. 14/295,270, entitled "System and Method for Dynamic Channel Allocation," filed Nov. 6, 2015, and naming Ronald Lee Bane and Brian J. Austin as inventors, which claims the benefit and priority from U.S. Provisional Patent Application Ser. No. 62/076,473, entitled "System and Method for Dynamic Channel Allocation," filed Nov. 6, 2014, and naming Ronald Lee Bane and Brian J. Austin as inventors, both of which are incorporated by reference herein for all purposes.

TECHNICAL FIELD

This disclosure relates in general to a system and method for dynamic channel allocation in a communications system and, in particular, to an improved system and method for dynamic channel allocation in a land mobile radio system, including a simulcast and a non-simulcast land mobile radio system, using one or more preference indicators.

BACKGROUND OF THE DISCLOSURE

Land mobile radio (LMR) systems are used by municipalities, governmental entities, including police, fire, medical, and military first responders, and other organizations to provide a private, wireless communications network using mobile and/or stationary radio units to communicate with one another over a specific geographic area. An LMR system can be as simple as two subscriber units communicating between themselves and a site over preset channels, or they can be complex consisting of hundreds of subscriber units and multiple sites. Generally, an LMR system includes a plurality of sites positioned in different locations in the specific geographic area to provide the desired coverage and bandwidth. Each site may include an antenna, a site controller, and a plurality of repeaters that include a transmitter and receiver at designated or desired frequencies. In certain embodiments, the sites, such as the site controllers, may communicate with each other through a backbone data network, such as an IP data network or the Internet, to assist with communications needs between the sites, such as call-setup activities and administrative functions needed for operating an LMR system.

An LMR System may, generally, be categorized as simulcast system or a non-simulcast system. In a simulcast trunking LMR system, a channel is comprised of two or more repeaters, each having common transmit frequencies, and common receive frequencies, but located at different geographical locations. The site locations are chosen to provide a wider coverage area than is possible with a single location. In such simulcast systems, repeater failures can result in a reduction in capacity, a reduction in coverage, or both. Consider, for example in a nine channel, three site simulcast LMR system, the failure of a single repeater at one site. If the channel is allowed to be included for use in subsequent communication requests, the RF coverage will suffer, due to the loss of transmit and/or receive functionality in the geographical area normally covered by the failed repeater. If the channel is not allowed to be included for use in subsequent communication requests, the system will operate over the preferred coverage area, but with reduced capacity. In this failure scenario, it is likely that the reduced capacity result is preferred over the reduced coverage area result.

Consider an alternate failure scenario where a site loses power, causing all repeaters at that site to fail. If the same preferred action from the previous scenario were applied in this case, all channels would be excluded from subsequent communication requests, resulting in zero capacity for the system. For this failure scenario, the reduced coverage result would be preferred over the zero capacity result.

When a call is setup in an LMR system, channels, which are comprised of underlying repeaters at one or more sites, are to be effectively allocated or various problems and disadvantages may occur, such as those just described, including decreased call coverage area, decreased bandwidth or capacity, and call quality.

SUMMARY

In a first aspect, there is provided a method for dynamic channel allocation in a land mobile radio communications system that includes allocating a control channel and a traffic channel based upon at least one preference indicator. The method may include determining one or more preference indicators for various channels for use in allocating the plurality of channels, wherein each of the plurality of channels is associated with one or more repeaters of a plurality of repeaters located at a plurality of sites of the land mobile radio communications system, determining a priority ranking for use in allocating each of the plurality of channels based at least in part on the one or more preference indicators, and receiving a first channel allocation request to allocate one of the plurality of channels as a control channel. The method may further includes allocating a first one of the plurality of channels as the control channel in response to the first channel allocation request by selecting the first one of the plurality of channels based on the highest ranked channel of the priority ranking for use in allocating each of the plurality of channels, receiving a second channel allocation request to allocate one of the plurality of channels as a traffic channel while the first one of the plurality of channels is allocated as the control channel, and allocating a second one of the plurality of channels as the traffic channel in response to the second channel allocation request by selecting the second one of the plurality of channels based on the then highest ranked channel of the priority ranking for use in allocating each of the plurality of channels.

In one embodiment of the method, the method further includes updating the priority ranking for use in allocating each of the plurality of channels based at least in part on changes to the one or more preference indicators.

In another embodiment of the method, the method further includes periodically updating the priority ranking for use in allocating each of the plurality of channels.

In still another embodiment of the method, the method further includes updating the priority ranking for use in allocating each of the plurality of channels based at least in part on changes in at least two or more of the one or more preference indicators.

In still yet another embodiment of the method, at least one of the one or more preference indicators includes a channel failure indicator for each of the plurality of channels that corresponds to the current operational indicator of the plurality of repeaters associated with each channel.

In one embodiment of the method, the channel failure indicator is determined for each of the plurality of channels and is based on the percentage of operational repeaters associated with a particular channel as compared to the total number of repeaters associated with that particular channel.

In yet another embodiment of the method, the one or more preference indicators includes at least one from the group that includes a channel failure indicator, a channel priority indicator, and a radio frequency interference indicator.

In still yet another embodiment of the method of dynamic channel allocation, the one or more preference indicators includes a channel failure indicator for each of the plurality of channels that corresponds to the current operational state of the plurality of repeaters associated with each channel, and a channel priority indicator that includes a static ranking of each of the plurality of channels.

In another embodiment of the method, the one or more preference indicators includes a channel priority indicator that includes a static ranking of each of the plurality of channels.

In yet another embodiment, the one or more preference indicators includes a radio frequency interference indicator that corresponds to radio frequency interference levels for each of the plurality of channels.

In one embodiment of the method, the one or more preference indicators includes a high reflected power indicator that corresponds to reflected power levels related to each of the plurality of channels.

In still another embodiment of the method, the one or more preference indicators includes at least one from the group that includes a channel failure indicator, a channel priority indicator, a radio frequency interference indicator, a high reflected power indicator, an excessive current drain indicator, a loss of backbone communications indicator, and a channel usage indicator.

In yet another embodiment of the method, the land mobile radio communications system is a simulcast land mobile radio communications system.

In yet still another embodiment, the land mobile radio communications system is a P25 trunking system.

In one embodiment of the method, the land mobile radio communications system includes a plurality of sites positioned at separate locations and in data communication with one another using a data communications network. And in another embodiment of the method, the data communications network is a backbone data communications network.

In another embodiment of the method, determining the priority ranking for use in allocating each of the plurality of channels is based on a weighted average of at least a first preference indicator and a second preference indicator of the one or more preference indicators.

In still another embodiment of the method, determining the priority ranking for use in allocating each of the plurality of channels is based on a weighted average of at least a first preference indicator and two or more of the indicators from the group including or consisting of a channel priority indicator, a radio frequency interference indicator, a high reflected power indicator, an excessive current drain indicator, a loss of backbone communications indicator, and a channel usage indicator.

In a second aspect, there is provided a method for dynamic channel allocation in a land mobile radio communications system that includes determining a first and second preference indicator and allocating a first channel and a second channel based upon at least the first preference indicator. The method may include determining the first preference indicator and the second preference indicator for each of a plurality of channels for use in allocating the plurality of channels associated with one or more repeaters located at a plurality of sites. The first preference indicator includes a channel failure indicator for each of the plurality of channels that corresponds to the current operational state of the plurality of repeaters associated with each such channel, and the second preference indicator is one or more from the group including or consisting of a channel priority indicator, a radio frequency interference indicator, and a high reflected power indicator. The method may further include determining a priority ranking for use in allocating each of the plurality of channels based at least in part on the first preference indicator that includes the channel failure indicator for each of the plurality of channels, receiving a channel allocation request, and allocating a channel in response to the channel allocation request by selecting an available channel based on the priority ranking for allocating each of the plurality of channels.

In one embodiment of the method, determining the priority ranking for use in allocating each of the plurality of channels is based at least in part on both the first preference indicator and the second preference indicator. In another embodiment of the method, the second preference indicator for use in allocating the plurality of channels is the channel priority indicator that includes a static ranking of each of the plurality of channels.

In yet another embodiment of the method, the second preference indicator for use in allocating the plurality of channels is the radio frequency interference indicator that corresponds to radio frequency interference levels for each of the plurality of channels.

In still yet another embodiment of the method, the second preference indicator for use in allocating the plurality of channels is the high reflected power indicator that corresponds to reflected power levels related to each of the plurality of channels.

In one embodiment of the method, the second preference indicator for use in allocating the plurality of channels is one from the group including or consisting of the channel priority indicator, the radio frequency interference indicator, a high reflected power indicator, an excessive current drain indicator, a loss of backbone communications indicator, and a channel usage indicator.

In another embodiment of the method, the land mobile radio communications system is a simulcast land mobile radio communications system.

In yet another embodiment of this method, the method further includes periodically determining the priority ranking for use in allocating each of the plurality of channels based at least in part on the first preference indicator that includes the channel failure indicator for each of the plurality of channels.

In still another embodiment of the method, the method further includes updating the priority ranking for use in allocating each of the plurality of channels based at least in part on changes in the first preference indicator.

In yet another embodiment of the method, the method further includes updating the priority ranking for use in allocating each of the plurality of channels based at least in part on changes in the first preference indicator or the second preference indicator.

In one embodiment of the method, the allocated channel is a traffic channel configured to exchange voice communications.

In another embodiment of the method, the allocated channel is a control channel.

In still another embodiment of the method, the channel failure indicator is determined for each of the plurality of channels and is based on the percentage of operational repeaters associated with a particular channel as compared to the total number of repeaters associated with that particular channel.

In yet another embodiment of the method, each of the plurality of channels includes one or more repeaters located at a plurality of land mobile radio sites.

In one embodiment of the method, the priority ranking for use in allocating each of the plurality of channels is based on a weighted average that includes at least the first preference indicator and the second preference indicator.

In another embodiment of the method, determining the priority ranking for use in allocating each of the plurality of channels is based on a weighted average of the first preference indicator and two or more of the indicators from the second preference indicator from the group including or consisting of the channel priority indicator, the radio frequency interference indicator, a high reflected power indicator, an excessive current drain indicator, a loss of backbone communications indicator, and a channel usage indicator.

In a third aspect, there is provided a land mobile radio communications system with dynamic channel allocation to provide mobile communications between at least two of a plurality of radio subscriber units. The land mobile radio communications system includes a plurality of sites positioned at separate locations in data communication with one another using a data network, and wherein each of the plurality of sites includes a plurality of repeaters configured to provide a plurality of channels for communications between at least two of the plurality of radio subscriber units, and one or more processors configured to provide dynamic channel allocation. The one or more processors may be configured to provide dynamic channel allocation that includes the capability to determine one or more preference indicators for each of the plurality of channels for use in allocating the plurality of channels, wherein each of the plurality of channels is associated with one or more repeaters of the plurality of repeaters located at the plurality of sites of the land mobile radio communications system, and to determine a priority ranking for use in allocating each of the plurality of channels based at least in part on the one or more preference indicators. The one or more processors may be further configured to provide the capability to receive a first channel allocation request to allocate one of the plurality of channels as a control channel, to allocate a first one of the plurality of channels as the control channel in response to the first channel allocation request by selecting the first one of the plurality of channels based on the highest ranked channel of the priority ranking for use in allocating each of the plurality of channels, to receive a second channel allocation request to allocate one of the plurality of channels as a traffic channel while the first one of the plurality of channels is allocated as the control channel, and to allocate a second one of the plurality of channels as the traffic channel in response to the second channel allocation request by selecting the second one of the plurality of channels based on the then highest ranked channel of the priority ranking for use in allocating each of the plurality of channels.

In one embodiment of the LMR system, the one or more processors are further configured to update the priority ranking for use in allocating each of the plurality of channels based at least in part on changes to the one or more preference indicators.

In another embodiment of the LMR system, the one or more processors are further configured to periodically update the priority ranking for use in allocating each of the plurality of channels.

In yet another embodiment of the LMR system, the one or more processors are further configured to update the priority ranking for use in allocating each of the plurality of channels based at least in part on changes in at least two or more of the one or more preference indicators.

In still another embodiment of the LMR system, the at least one of the one or more preference indicators includes a channel failure indicator for each of the plurality of channels that corresponds to the current operational state of the plurality of repeaters associated with each channel.

In another embodiment of the LMR system, the channel failure indicator is determined for each of the plurality of channels and is based on the percentage of operational repeaters associated with a particular channel as compared to the total number of repeaters associated with that particular channel.

In one embodiment of the LMR system, the one or more preference indicators includes at least one from the group that includes a channel failure indicator, a channel priority indicator, a radio frequency interference indicator, and a high reflected power indicator.

In yet another embodiment of the LMR system, the one or more preference indicators includes a channel failure indicator for each of the plurality of channels that corresponds to the current operational state of the plurality of repeaters associated with each channel, and a channel priority indicator that includes a static ranking of each of the plurality of channels.

In still another embodiment of the LMR system, the one or more preference indicators includes a channel priority indicator that includes a static ranking of each of the plurality of channels.

In another embodiment of the LMR system, the one or more preference indicators includes at least one from the group that includes a channel failure indicator, a channel priority indicator, a radio frequency interference indicator, a high reflected power indicator, an excessive current drain indicator, a loss of backbone communications indicator, and a channel usage indicator.

In yet another embodiment of the LMR system, the land mobile radio communications system is a simulcast land mobile radio communications system.

In still another embodiment of the LMR system, the is a conventional system.

In one embodiment of the LMR system, the determination of the priority ranking for use in allocating each of the plurality of channels is based on a weighted average of at least a first preference indicator and a second preference indicator of the one or more preference indicators.

In a fourth aspect, there is provided a dynamic channel allocation system configured for use in a land mobile radio communications system that provides mobile communications between at least two of a plurality of radio subscriber units is provided. The land mobile radio communications system includes a plurality of sites in communication with one another and positioned at separate locations, and wherein each of the plurality of sites includes a plurality of repeaters configured to provide a plurality of channels for communication between the at least two of the plurality of radio subscriber units. The dynamic channel allocation system may include one or more processors configured to determine one or more preference indicators for each of the plurality of channels for use in allocating the plurality of channels, wherein each of the plurality of channels is associated with one or more repeaters of the plurality of repeaters located at a plurality of sites of the land mobile radio communications system, and to determine a priority ranking for use in allocating each of the plurality of channels based at least in part on the one or more preference indicators. The one or more processors may be further configured to receive a first channel allocation request to allocate one of the plurality of channels as a control channel, to allocate a first one of the plurality of channels as the control channel in response to the first channel allocation request by selecting the first one of the plurality of channels based on the highest ranked channel of the priority ranking for use in allocating each of the plurality of channels, to receive a second channel allocation request to allocate one of the plurality of channels as a traffic channel while the first one of the plurality of channels is allocated as the control channel, and to allocate a second one of the plurality of channels as the traffic channel in response to the second channel allocation request by selecting the second one of the plurality of channels based on the then highest ranked channel of the priority ranking for use in allocating each of the plurality of channels.

In one embodiment of the dynamic channel allocation system, the land mobile radio communications system is a P25 trunking system.

In another embodiment of the dynamic channel allocation system, the one or more processors are further configured to update the priority ranking for use in allocating each of the plurality of channels based at least in part on changes in at least two or more of the one or more preference indicators.

In yet another embodiment of the dynamic channel allocation system, the at least one of the one or more preference indicators includes a channel failure indicator for each of the plurality of channels that corresponds to the current operational state of the plurality of repeaters associated with each channel.

In still another embodiment of the dynamic channel allocation system, the one or more preference indicators includes at least one from the group that includes a channel failure indicator, a channel priority indicator, a radio frequency interference indicator, and a high reflected power indicator.

In one embodiment of the dynamic channel allocation system, the one or more preference indicators includes at least one from the group that includes a channel failure indicator, a channel priority indicator, a radio frequency interference indicator, a high reflected power indicator, an excessive current drain indicator, a loss of backbone communications indicator, and a channel usage indicator.

In still another embodiment of the dynamic channel allocation system, the determination of the priority ranking for use in allocating each of the plurality of channels is based on a weighted average of at least a first preference indicator and a second preference indicator of the one or more preference indicators.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments, and are not necessarily drawn to scale.

DETAILED DESCRIPTION

Figure 1:
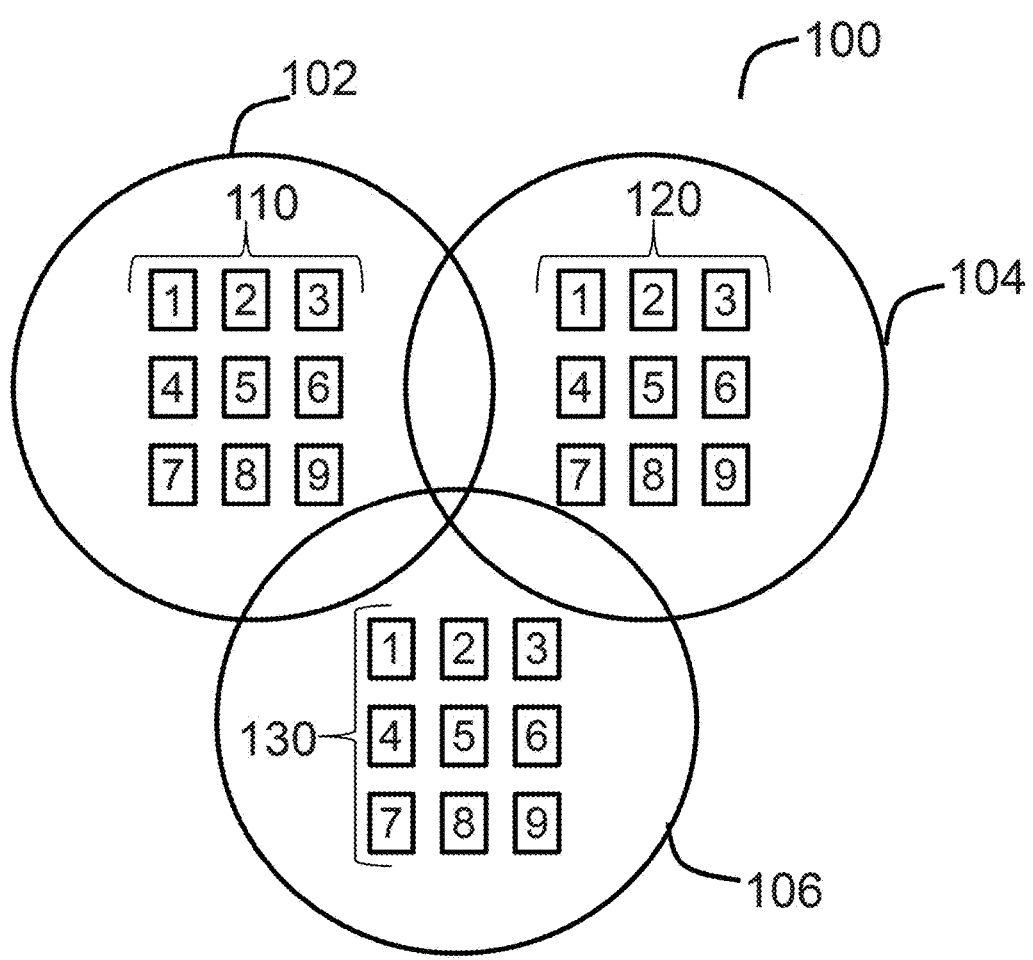
FIG. 1 is an overview diagram that illustrates an exemplary LMR system with dynamic channel allocation that includes three sites that each include nine repeaters and that each have a designated geographic coverage area, according to an embodiment.

FIG. 1 is an overview diagram of an exemplary land mobile radio (LMR) system 100 with dynamic channel allocation. The LMR system 100 includes a first site 102, a second site 104, and a third site 106. The circles around each of the sites indicate an approximate geographic coverage area for such sites of the LMR system 100. Each of the three exemplary sites of FIG. 1 include nine repeaters. For example, the first site 102 includes a plurality of repeaters 110, as illustrated, having nine repeaters. Each such repeater of the plurality of repeaters 110 includes the capability to transmit and receive. Similarly, the second site 104 includes a plurality of repeaters 120, which also includes nine repeaters similar to the plurality of repeaters 110 of the first site 102. The third site 106 also includes a plurality of repeaters 130 that includes nine repeaters.

Not shown in FIG. 1 is a data network, such as a backbone network, which may be implemented as an IP network, that is used to provide data communication between and among the sites of the LMR system 100. Further, various processors, servers, and supporting hardware may be provided at one or more of the sites, and these are not expressly shown in FIG. 1. This may include, depending on the implementation of the LMR system 100, site controllers provided at each site, or at designated sites. It should be understood that the LMR system 100 may be provided as a P25 system, a trunk system, a conventional system, a simulcast system, a non-simulcast system, or virtually any other implementation of an LMR system.

In operation, a radio subscriber unit, which may be a portable or mobile radio and/or a stationary radio unit, is in communication with one or more of the sites of the LMR system 100, and a request is made to set up a channel for communication with one or more other radio units. In such a case, a dynamic channel allocation system includes one or more preference indicators that may be used to prioritize the available channels so that the appropriate or desired traffic channel is selected when the traffic channel request is received. A control channel may be allocated using the same or similar dynamic channel allocation system and the one or more preference indicators so that an appropriate or desired control channel is set up at startup and at other designated times when a control channel is needed.

In a simulcast system, a channel, such as a control channel or a traffic channel, may include a repeater at each of the three sites 102, 104, and 106 that transmits and receives on the same frequency. For example, a channel request to set up a control channel may result in a dynamic channel allocation of a channel that is defined as including a repeater "1" from the plurality of repeaters 110, 120, and 130, from the various sites of the LMR system 100. One or more preference indicators may be used to rank the nine channels of the LMR system 100. In one implementation, a health indicator, which also may be referred to as a channel failure indicator, may be used as the first and only preference indicator. The channel failure indicator may be calculated in a variety of ways. For example, if one of the three repeaters for channel one is not available, a simple percentage of 67% may represent the channel failure indicator of channel one. If all three repeaters of channel one are available, then the health or channel failure indicator may be represented as 100% or as a "1." As such, the various nine channels of the simulcast LMR system 100 may be ranked so that whenever a channel request is made to use such a channel, the channels may be dynamically allocated according to the ranked priority as provided by the preference indicator, which is illustrated to be a channel failure indicator.

In other embodiments, two or more preference indicators may be used to determine how such channels are dynamically allocated. For example, a channel priority indicator may be provided to rank each such channel that is simply a static ranking of the various channels. A radio frequency interference indicator may be used to rank such channels, and such indicator may be from a periodic measurement of RF interference on the various channels so that the ranking may be adjusted to allow for the channel with the least amount of radio interference to be allocated when requested by user. This may significantly improve overall call quality and performance of the LMR system 100. Of course, this indicator may be weighted as desired and included as part of two or more preference indicators for use in compiling the channel allocation priority.

Other preference indicators may include a high reflected power indicator, an excessive current drain indicator, a loss of backbone communications indicator, and a channel usage indicator. For example, a high reflected power indicator, similar to the radio frequency interference indicator, may be implemented using periodic calculations of power being reflected on each such channel. Those channels with more reflected power are considered less desirable and thus would be ranked in a lower priority than those with less reflected power. Similarly, an excessive current drain indicator, such as the current drain provided at a final amplifier or other amplifier of a repeater, may be measured continuously or periodically, and the various repeaters and corresponding channels may then be ranked accordingly. A channel usage indicator may include a ranking of the channels based upon the usage of such channels. As such, in one embodiment, the channels that are less frequently used may be ranked higher to be allocated more frequently in order to even out overall usage of the various repeaters and channels of the LMR system 100. Finally, and as mentioned previously, a data network, not shown in FIG. 1, is provided to allow the various sites, including the first site 102, the second site 104, and the third site 106 to communicate with each other. If this data network connection is lost to one or more of the sites, then the loss of backbone communications indicator may be used to provide a dynamic channel allocation or influence the overall channel allocation priority list.

Two or more of the various preference indicators may be used to dynamically allocate a channel. For example, a first preference indicator may include the channel failure indicator and this may be provided a certain "weighting" in determining how the various channels and underlining repeaters are dynamically ranked for allocation. A second preference indicator, such as a radio frequency interference indicator, may provide another "weighting" in determining how to allocate the various channels. This weighting may be provided in any of a variety of ways, including equal weighting, unequal weighting, and secondary weighting in the event that the first or prior preference indicator does not distinguish one channel from another. For example, if the channel failure indicator is the first preference indicator, and the repeaters for two particular channels are in service and operational, then no distinction can be made between the two channels based on the channel failure indicator. The secondary preference indicator may include a radio frequency interference indicator that indicates that one channel is preferable or has less RF interference than the second channel. As such, the preferred channel may be ranked and dynamically allocated prior to the other, less desirable, channel.

In a preferred embodiment, a channel failure indicator (aka a channel health indicator) is used as a first preference indicator and it is maintained or determined for each channel in a system. This numerical representation provides a relative channel preference among the various channels and takes into account repeater failure status for each such channel. In another implementation, the radio frequency or RF interference indicator is determined or detected by comparing a duration of consecutive RSSI samples of unassigned channels over a threshold level against a configured duration (assigning the minimum value to the RFII factor). In such a case, an RF interference detection is cleared when the detection mechanism fails to detect for a configured duration of time. In another implementation of the radio frequency interference indicator, RF interference is detected or measured using a moving average of RF level on each channel at a time when a channel is unassigned or unallocated. In other embodiments, the channel priority indicator is simply a static list of rankings of the various channels of the LMR system 100.

Although not specifically shown in FIG. 1, the dynamic channel allocation may be performed by a site controller, or other server or processor(s) that may be implemented at one or more of the various sites of the LMR system 100. In a simulcast embodiment, the site controller may be implemented at each of the three sites of the LMR system 100, with one of the site controllers designated as the active site controller to perform the dynamic channel allocation as provided and described herein. The remaining site controllers are provided as hot standby or available in the event the primary or active site controller fails. In other implementation of the LMR system 100, such as in a non-simulcast LMR system, each of the sites may include a site controller or one or more processors to provide the dynamic channel allocation for each such site. In such a case, a control channel is designated at each location, and such control channel is used as various traffic channels are allocated during the operation of the LMR system 100. The allocation of various channels may use the dynamic channel allocation methods and processes described and provided herein. As previously mentioned, the various preference indicators and rankings may be performed periodically or may be adjusted upon a change in one or more of the preference indicators.

Figure 2:
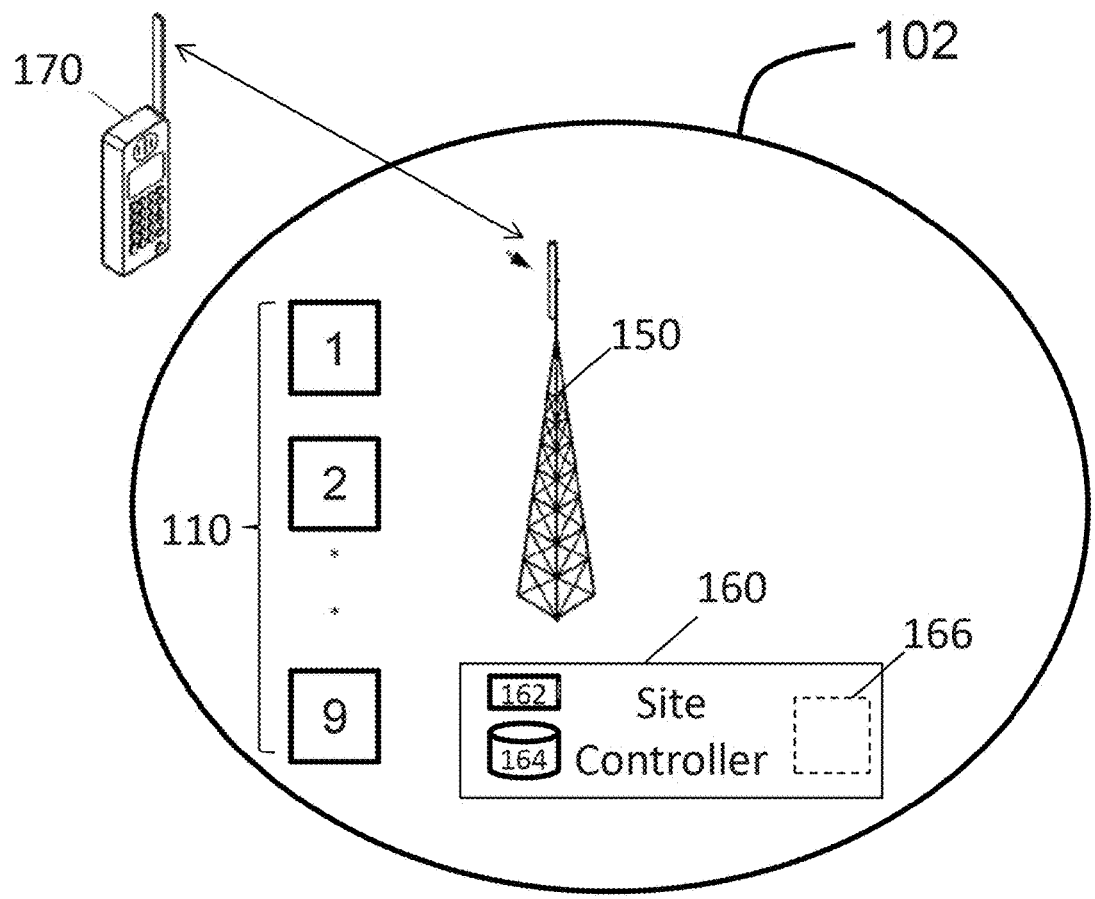
FIG. 2 is an overview diagram that illustrates an exemplary site of an LMR system in communication with a mobile radio unit, and including an antenna, a plurality of repeaters, and a site controller with one or more processors, a memory or storage device, and a dynamic channel allocation system, according to one embodiment.

FIG. 2 is an overview diagram that illustrates an exemplary site 102, such as site 102 of FIG. 1, of an LMR system that is in communication with a mobile radio unit 170. The site 102 includes an antenna 150, shown communicating with the mobile radio unit 170, as well as the plurality of repeaters 110, which, as in FIG. 1, includes nine repeaters, in this particular embodiment. The site 102 also includes a site controller 160, which may be implemented as one or more servers or computers and will include one or more processors 162, memory and/or storage 164, and a dynamic channel allocation system 166, which is shown in FIG. 2 at the dashed box. The dynamic channel allocation system 166 may be implemented in software or code using a site controller 160 or using an external system dedicated for such application, or using a distributed processing system at different locations. In one implementation, the dynamic channel allocation system 166 is implemented using instructions carried out by the one or more processors 162 of the site controller 160.

Just as in FIG. 1, the backbone data network connecting the site 102 to other sites of an LMR system is not specifically shown. In a simulcast LMR system, an active site controller 160 may be provided at one or more of the sites of the LMR system, or at a separate location that is in communication with the one or more sites of the LMR system. In a non-simulcast system, each site of the LMR system will generally have its own site controller, and such site controller may be configured or implemented to carry out the dynamic channel allocation as described herein. In other embodiments, a dedicated computer or system is provided to provide such dynamic channel allocation functionality.

Figure 3:
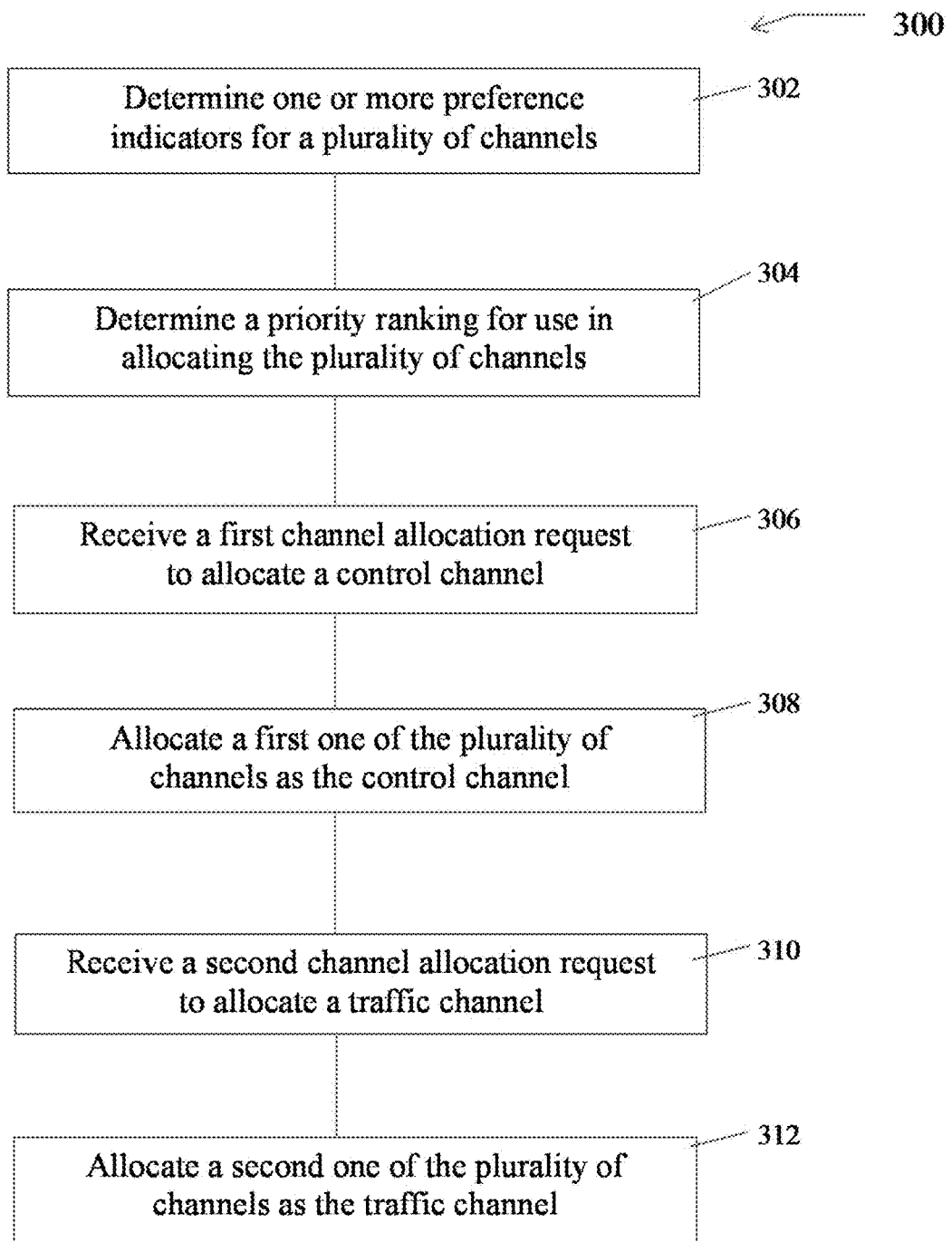
FIG. 3 is a flowchart that illustrates an exemplary method for dynamic channel allocation in a land mobile radio communications system that involves using at least one preference indicator, such as a channel failure indicator, to allocate a control channel and a traffic channel, according to an exemplary embodiment.

FIG. 3 is a flow chart that illustrates an exemplary method 300 for dynamic channel allocation in an LMR system. The method 300 includes using at least one preference indicator, such as the channel failure indicator (which also may be referred to as a health preference indicator) to allocate a control channel and/or one or more traffic channels in an LMR system.

The method 300 for dynamic channel allocation begins at 302 where one or more preference indicators for a plurality of channels are determined. For example, in a simulcast system where each of the various channels are made up of repeaters located at each of the plurality of sites of the LMR system, various preference indicators may be determined or measured to assist with determining how to dynamically allocate such channels when a request is made to allocate either a control channel or a traffic channel. Of course, a control channel is generally initially allocated at startup and is used to assist with allocating traffic channels thereafter. It should be understood, that the allocation of both the control channel and the various traffic channels may be allocated using the dynamic channel allocation as provided and described herein. In other implementations, either the control channel is allocated using dynamic channel allocation or the traffic channels are allocated using the dynamic channel allocation, as may be provided in a particular implementation or embodiment.

Proceeding next to step 304, a priority ranking is determined based on a one or more preference indicators. In the case of only one preference indicator being used, and in a preferred embodiment, a channel failure indicator is used to rank the various channels. This helps ensure that fully functioning channels that include all or most repeaters are allocated first. This provides better overall performance to users of such an LMR system. Depending on a particular embodiment, the priority ranking of the method 300 as provided in 304 may be implemented using a weighted average of two or more preference indicators, as previously discussed, or may use succeeding preference indicators until a preferred channel is identified.

Proceeding next to 306, a first channel allocation request is received, such as when the LMR system is first operational or at a later time, and a control channel is allocated at 308 as indicated in the method 300. The allocation of the control channel is provided using the dynamic channel allocation based on the one or more preference indicators previously described. Once the control channel is allocated, the method 300 proceeds next to step 310. At 310, a second channel allocation request is received, and the current priority ranking for the various channels is accessed at step 312, where the highest priority ranked channel is then allocated as a traffic channel. Successive traffic channel allocations may then be allocated by proceeding back to step 310 where a third channel allocation request may be received and the next priority ranking is used to allocate such a request. Of course, the priority ranking in the various one or more preference indicators may be periodically updated, continuously updated, and/or updated as conditions and/or characteristics of the LMR system change. For example, a radio interference indicator, a high reflected power indicator, or an excessive current drain indicator may all vary over time depending on the operational characteristics and conditions of the various sites, repeaters and channels of the LMR system.

The channel failure indicator corresponds to the current operational state of the plurality of repeaters associated with a channel in a simulcast LMR system, and it may be calculated based upon a percentage or value equal to or less than one. In one implementation, this may be used as the initial determination for ranking and allocating the various channels, while a channel priority indicator, which is simply a static ranking of each of the plurality of channels, may be used as a second or third preference indicator. Of course, a variety of other preference indicators may be used such as a radio frequency interference indicator, a high reflected power indicator, an excessive current drain indicator, which measures the current drain and an amplifier of a repeater, a loss of backbone communications indicator, and a channel usage indicator. Any of a number of these indicators may be used so that a dynamic channel allocation may be provided. Ultimately, a priority ranking is provided so that when a channel request is received by the LMR system, a preferred or desired channel may be expeditiously allocated.

Figure 4:
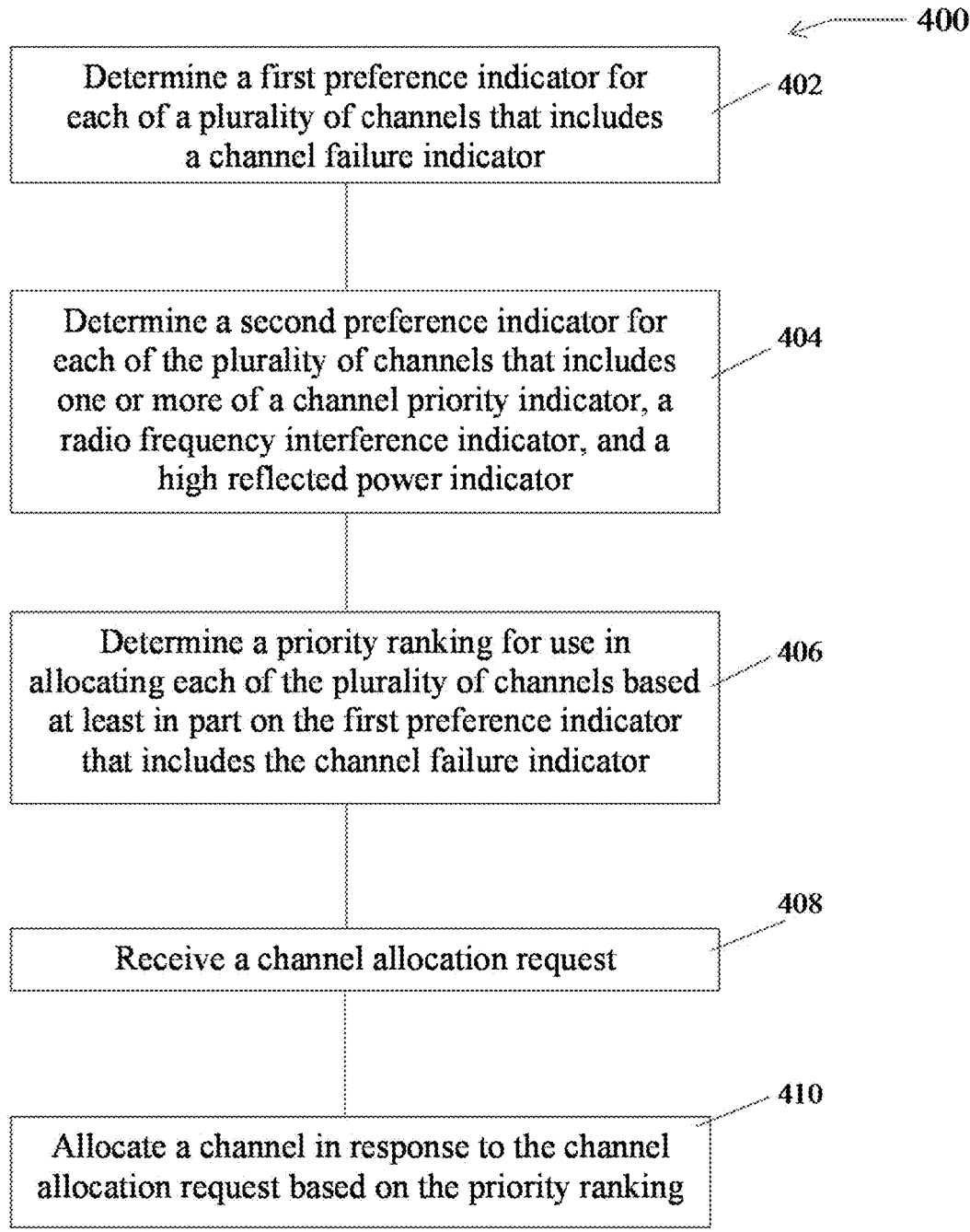
FIG. 4 is a flowchart that illustrates another exemplary method for dynamic channel allocation in a land mobile radio communications system that includes at least a first preference indicator and a second preference indicator, according to another exemplary embodiment.

FIG. 4 is a flowchart that illustrates another exemplary method 400 for dynamic channel allocation in an LMR system. The method 400 begins at block 402 where a first preference indicator is determined for each of the plurality of channels. In this embodiment, the first preference indicator includes a channel failure indicator, which may be thought of as a health indicator of the various channels. As previously discussed, the channel failure indicator is based upon the operational status of the one or more repeaters that make up each of the plurality of channels. Proceeding next to 404, a second preference indicator is determined for each of the plurality of channels. The second preference indicator may include one or more of the preference indicators and include a channel priority indicator, a radio frequency interference indicator, and a high reflected power indicator, which may be implemented using testing or measurement equipment to periodically or continuously measure the reflected power of the various channels.

The method 400 proceeds next to 406 where a priority ranking is determined for use in dynamically allocating each of the plurality of channels. This priority ranking is determined based at least in part on the first preference indicator, which includes the channel failure indicator. It may also be partially based on the second preference indicator as well.

Proceeding next to 408, in operation, an LMR system may periodically receive channel allocation requests. In such a case, the method 400 proceeds to 410 where a channel is dynamically allocated based upon the current priority ranking of the various available channels. As previously discussed and as provided above in FIG. 4, the priority ranking may be determined based on a channel failure indicator and various one or more secondary preference indicators.

An overview of certain implementations, examples, and embodiments of a system and method dynamic channel priority is provided below. When channel requests are made by a subscriber radio on a P25 control channel, a channel is selected from the pool of available traffic channels. When the pool of available traffic channels contains channels with different priorities, the traffic channel with the highest priority is chosen. When there is more than one channel with the same highest priority, the one that was least recently used is chosen, in order to distribute the allocation of channels with common priority.

In a preferred embodiment, the channel allocation priority is dynamically determined using a weighting of channel health and a configured static channel priority, as previously discussed in connection with the channel failure indictor and the channel priority indicator. A user configurable static channel priority exists for each channel in the system. This may range from 1-28, in one embodiment, with 1 being the highest static priority. Channel health, or the channel failure indicator, may be expressed as a percentage of the number of sites having fully operational repeaters for that channel, rounded to the nearest percent. (0-100).

In one example, the dynamic channel allocation priority may be determined as provided by the following weighting: Total Dynamic Channel Allocation Priority=(29−StaticPriority)+(100*ChannelHealth). The constants 29, and 100, are chosen such that the overall Dynamic Channel Allocation Priority may include of a 5 digit number, in this embodiment, represented as HHHSS, where HHH is Channel Health (000–100), and SS is Static Priority (01-28). In this particular embodiment, this places more significance on the channel health than its static priority, even when there is only a single working repeater out of a potential of over 300 sites.

Various failure scenarios may include the following:

Failure Scenario 1: consider the failure scenario of a nine channel, three site system, with one repeater failure, and some or all channels with a static channel priority of 15. The eight fully operational channels have a Dynamic Priority of Channel Health=3/3*100=100, and an overall weighted Total Dynamic Channel Allocation Priority=(29−15)+(100*100)=10014, while the one channel with the failed repeater has a weighted Total Dynamic Channel Allocation Priority=(29−15)+(100*67)=6714. In this case, the eight fully operational channels would be assigned before considering the use of the channel with one non-operational repeater. This results in full RF coverage except when the system reaches maximum capacity.

Failure Scenario 2: consider the failure scenario of a nine channel, three site system, with nine repeater failures at one site, and some or all channels with a static channel priority of 15. In such a situation, the channels have a weighted Total Dynamic Channel Allocation Priority=(29−15)+(100*67)=6714. In this case, the channels may have equal priority, resulting in full capacity, but with reduced RF coverage. The same method can be applied to selecting a preferred control channel.

In an alternative embodiment, the channel allocation priority may be dynamically determined using a combination of channel health, the absence of RF interference, and a configured static channel priority. As in the preferred embodiment, a user configurable static channel priority is provided for each channel in the system. This ranges from 1-28, in this embodiment, with 1 being the highest static priority. As in the preferred embodiment, the Channel health, or the channel failure indicator, may be expressed as the percentage of the number of sites having fully operational repeaters for that channel, rounded to the nearest percent. (0-100). The RF Interference (RFI) Indicator (RFII) is an assessment of the quality of the channel in consideration of detected RF interference, ranging from 0-100, where 100 indicates no RFI detected, and 0 indicates the worst level of RFI detected. This may be referred to as the RF interference indicator. In this embodiment, there are only two levels of RFI, 0 and 100. RFII is initially assumed to be at 100, i.e., no interference. The receive signal strength is sampled once per second, in this example. While a channel is not assigned for traffic, the number of consecutive samples at or above a configured threshold is used to indicate the presence of RF interference on the channel. After reaching this threshold, the RFII is set to 0 and stays at 0 until the detection of RFI, using this method, results in no RFI detected for a configured duration of time, at which time the RFII is set to 100.

In this alternative embodiment, the weighted Total Dynamic Channel Allocation Priority=(29−StaticPriority)+(100*RFII)+(100000*ChannelHealth). The constants 29, 100, and 100000, are chosen such that the overall Total Dynamic Channel Allocation Priority will be an eight digit number in this embodiment, represented as HHHIIISS, where where HHH is Channel Health (000-100), III is Interference Indicator (000-100), and SS is Static Priority (01-28). In this alternative embodiment, this places most significance on the channel health, followed by RF Interference, and finally static priority.

In the foregoing description of certain embodiments, specific terminology has been resorted to for the sake of clarity. The disclosure, however, is not intended to be limited to the specific terms so selected, and it is to be understood that each specific term includes other technical equivalents which operate in a similar manner to accomplish a similar technical purpose. Terms such as "left" and right", "front" and "rear", "above" and "below", "first" and "second", and the like are used as words of convenience to provide reference points or distinction points and are not to be construed as limiting terms or as time dependent terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A method for dynamic channel allocation in a land mobile radio communications system, the method comprising:
   determining one or more preference indicators for each of a plurality of channels for use in allocating the plurality of channels, wherein each of the plurality of channels is associated with one or more repeaters of a plurality of repeaters of the land mobile radio communications system;
   determining a priority ranking for use in allocating each of the plurality of channels based at least in part on the one or more preference indicators;
   receiving a first channel allocation request to allocate one of the plurality of channels;
   allocating a first one of the plurality of channels in response to the first channel allocation request by selecting the first one of the plurality of channels based on a then highest ranked channel of the priority ranking used in allocating each of the plurality of channels.

2. The method of dynamic channel allocation according to claim 1, further comprising:
   updating the priority ranking for use in allocating each of the plurality of channels based at least in part on changes to the one or more preference indicators.

3. The method of dynamic channel allocation according to claim 1, further comprising:
   periodically updating the priority ranking for use in allocating each of the plurality of channels.

4. The method of dynamic channel allocation according to claim 1, further comprising:
   updating the priority ranking for use in allocating each of the plurality of channels based at least in part on changes in at least two or more of the preference indicators.

5. The method of dynamic channel allocation according to claim 1, wherein at least one of the one or more preference indicators includes a channel failure indicator at least one of the plurality of channels that corresponds to a current operational state of the plurality of repeaters associated with that channel.

6. The method of dynamic channel allocation according to claim 5, wherein the channel failure indicator is determined for each of the plurality of channels and is based on the percentage of operational repeaters associated with a particular channel as compared to the total number of repeaters associated with that particular channel.

7. The method of dynamic channel allocation according to claim 1, wherein the one or more preference indicators includes at least one from a group comprising a channel failure indicator, a channel priority indicator, and a radio frequency interference indicator.

8. The method of dynamic channel allocation according to claim 1, wherein the one or more preference indicators includes a channel failure indicator for each of the plurality of channels that corresponds to a current operational state of the plurality of repeaters associated with each channel, and a channel priority indicator that includes a static ranking of each of the plurality of channels.

9. The method of dynamic channel allocation according to claim 1, wherein the one or more preference indicators includes a channel priority indicator that includes a static ranking of each of the plurality of channels.

10. The method of dynamic channel allocation according to claim 1, wherein the one or more preference indicators includes a radio frequency interference indicator that corresponds to radio frequency interference levels for each of the plurality of channels.

11. The method of dynamic channel allocation according to claim 1, wherein the one or more preference indicators include a high reflected power indicator that corresponds to reflected power levels related to each of the plurality of channels.

12. The method of dynamic channel allocation according to claim 1, wherein the one or more preference indicators include at least one from a group that comprises a channel failure indicator, a channel priority indicator, a radio frequency interference indicator, a high reflected power indicator, an excessive current drain indicator, a loss of backbone communications indicator, and a channel usage indicator.

13. The method of dynamic channel allocation according to claim 1, wherein the land mobile radio communications system is a simulcast land mobile radio communications system.

14. The method of dynamic channel allocation according to claim 1, wherein the land mobile radio communications system includes a plurality of sites positioned at separate locations and in data communication with one another using a data communications network.

15. The method of dynamic channel allocation according to claim 14, wherein the data communications network is a backbone data communications network.

16. The method of dynamic channel allocation according to claim 1, wherein the priority ranking for use in allocating each of the plurality of channels is determined based on a weighted average of at least a first preference indicator and a second preference indicator of the one or more preference indicators.

17. The method of dynamic channel allocation according to claim 1, wherein determining the priority ranking for use in allocating each of the plurality of channels is based on a weighted average of at least a first preference indicator and two or more of the indicators from the group consisting of a channel priority indicator, a radio frequency interference indicator, a high reflected power indicator, an excessive current drain indicator, a loss of backbone communications indicator, and a channel usage indicator.

18. A method for dynamic channel allocation in a land mobile radio communications system, the method comprising:
   determining a first preference indicator for each of a plurality of channels for use in allocating the plurality of channels, wherein each of the plurality of channels is associated with one or more repeaters of the land mobile radio communications system, and wherein the first preference indicator includes a channel failure indicator for each of the plurality of channels that corresponds to a current operational state of the one or more repeaters associated with each such channel;
   determining a priority ranking for use in allocating each of the plurality of channels based at least in part on the first preference indicator that includes the channel failure indicator for each of the plurality of channels;

receiving a channel allocation request; and allocating a channel in response to the channel allocation request by selecting an available channel based on the priority ranking for allocating each of the plurality of channels.

19. The method of dynamic channel allocation according to claim 18, further comprising determining a second preference indicator for each of the plurality of channels for use in allocating the plurality of channels associated with the one or more repeaters, wherein the second preference indicator is associated with each of the plurality of channels and includes one or more from the group consisting of a channel priority indicator, a radio frequency interference indicator, and a high reflected power indicator; and wherein determining the priority ranking for use in allocating each of the plurality of channels is based at least in part on both the first preference indicator and the second preference indicator.

20. The method of dynamic channel allocation according to claim 19, wherein the second preference indicator for use in allocating the plurality of channels is the radio frequency interference indicator that corresponds to radio frequency interference levels for each of the plurality of channels.

21. The method of dynamic channel allocation according to claim 19, wherein the second preference indicator for use in allocating the plurality of channels is the high reflected power indicator that corresponds to reflected power levels related to each of the plurality of channels.

22. The method of dynamic channel allocation according to claim 18, further comprising:
periodically determining the priority ranking for use in allocating each of the plurality of channels based at least in part on the first preference indicator that includes the channel failure indicator for each of the plurality of channels.

23. The method of dynamic channel allocation according to claim 18, further comprising:
updating the priority ranking for use in allocating each of the plurality of channels based at least in part on changes in the first preference indicator.

24. The method of dynamic channel allocation according to claim 19, further comprising:
updating the priority ranking for use in allocating each of the plurality of channels based at least in part on changes in the first preference indicator or the second preference indicator.

25. The method of dynamic channel allocation according to claim 18, wherein the allocated channel is a control channel.

26. The method of dynamic channel allocation according to claim 18, wherein the channel failure indicator is determined for each of the plurality of channels and is based on the percentage of operational repeaters associated with a particular channel as compared to the total number of repeaters associated with that particular channel.

27. The method of dynamic channel allocation according to claim 18, wherein determining the priority ranking for use in allocating each of the plurality of channels is based on a weighted average that includes at least the first preference indicator and the second preference indicator.

28. The method of dynamic channel allocation according to claim 19, wherein determining the priority ranking for use in allocating each of the plurality of channels is based on a weighted average of the first preference indicator and two or more of the indicators from the second preference indicator from the group consisting of the channel priority indicator, the radio frequency interference indicator, a high reflected power indicator, an excessive current drain indicator, a loss of backbone communications indicator, and a channel usage indicator.

29. A land mobile radio communications system with dynamic channel allocation to provide mobile communications between at least two of a plurality of radio subscriber units, the land mobile radio communications system comprising:
one or more processors configured to provide dynamic channel allocation, the one or more processors configured to:
determine one or more preference indicators for each of the plurality of channels for use in allocating the plurality of channels, wherein each of the plurality of channels is associated with one or more repeaters of a plurality of repeaters of the land mobile radio communications system;
determine a priority ranking for use in allocating each of the plurality of channels based at least in part on the one or more preference indicators;
receive a first channel allocation request to allocate one of the plurality of channels as a control channel;
allocate a first one of the plurality of channels as the control channel in response to the first channel allocation request by selecting the first one of the plurality of channels based on the highest ranked channel of the priority ranking for use in allocating each of the plurality of channels;
receive a second channel allocation request to allocate one of the plurality of channels as a traffic channel while the first one of the plurality of channels is allocated as the control channel; and
allocate a second one of the plurality of channels as the traffic channel in response to the second channel allocation request by selecting the second one of the plurality of channels based on the then highest ranked channel of the priority ranking for use in allocating each of the plurality of channels.

30. The land mobile radio communications system of claim 29, wherein the land mobile radio communications system is a P25 trunking system.

31. The land mobile radio communications system of claim 29, wherein the one or more processors are further configured to:
update the priority ranking for use in allocating each of the plurality of channels based at least in part on changes to the one or more preference indicators.

32. The land mobile radio communications system of claim 29, wherein the one or more processors are further configured to:
periodically update the priority ranking for use in allocating each of the plurality of channels.

33. The land mobile radio communications system of claim 29, wherein the one or more processors are further configured to:
update the priority ranking for use in allocating each of the plurality of channels based at least in part on changes in at least two or more of the one or more preference indicators.

34. The land mobile radio communications system of claim 29, wherein the one or more preference indicators includes at least one from a group that comprises a channel failure indicator, a channel priority indicator, a radio frequency interference indicator, and a high reflected power indicator.

35. The land mobile radio communications system of claim 29, wherein the one or more preference indicators includes a channel failure indicator for each of the plurality of channels that corresponds to the current operational state of the plurality of repeaters associated with each channel, and a channel priority indicator that includes a static ranking of each of the plurality of channels.

36. The land mobile radio communications system of claim 29, wherein the one or more preference indicators include a channel priority indicator that includes a static ranking of each of the plurality of channels.

37. The land mobile radio communications system of claim 29, wherein the one or more preference indicators includes at least one from a group that comprises a channel failure indicator, a channel priority indicator, a radio frequency interference indicator, a high reflected power indicator, an excessive current drain indicator, a loss of backbone communications indicator, and a channel usage indicator.

38. The land mobile radio communications system of claim 29, wherein the land mobile radio communications system is a simulcast land mobile radio communications system.

\* \* \* \* \*